US010612756B1

(12) United States Patent
Hsu

(10) Patent No.: US 10,612,756 B1
(45) Date of Patent: Apr. 7, 2020

(54) CEILING LIGHT FIXTURE

(71) Applicant: Dong Guan Jia Sheng Lighting Technology Co., Ltd. China, Dong-Guna, Guang-Dong (CN)

(72) Inventor: Kevin Hsu, Taichung (TW)

(73) Assignee: Dong Guan Jia Sheng Lighting Technology Co., Ltd. China, Guang-Dong (CN)

( * ) Notice: Subject to any disclaimer, the term of this patent is extended or adjusted under 35 U.S.C. 154(b) by 0 days.

(21) Appl. No.: 16/502,061

(22) Filed: Jul. 3, 2019

(51) Int. Cl.
*B60Q 1/00* (2006.01)
*B60Q 3/00* (2017.01)
*F21V 21/03* (2006.01)

(52) U.S. Cl.
CPC .................................... *F21V 21/03* (2013.01)

(58) Field of Classification Search
CPC ............................................... F21V 21/02–049
USPC ................................. 362/147–150, 368–371
See application file for complete search history.

(56) References Cited

U.S. PATENT DOCUMENTS 9,057,505 B2 * 6/2015 Liu ....................... F21V 17/002

* cited by examiner

*Primary Examiner* — Jason M Han
(74) *Attorney, Agent, or Firm* — Alan D. Kamrath; Karin L. Williams; Mayer & Williams PC

(57) ABSTRACT

A ceiling light fixture includes a cover, a first mounting bracket, a second mounting bracket, and a plurality of retaining members. The first mounting bracket includes a bottom plate, a side plate, and a top plate. The side plate of the first mounting bracket is provided with a plurality of function holes. The second mounting bracket includes a bottom flange that is locked by the retaining members. Each of the retaining members is secured to the first mounting bracket by each of the function holes of the side plate, and the first mounting bracket is mounted on the second mounting bracket by the retaining members, such that the cover and the first mounting bracket are mounted on the second mounting bracket easily and quickly.

8 Claims, 4 Drawing Sheets

CEILING LIGHT FIXTURE

BACKGROUND OF THE INVENTION

1. Field of the Invention

The present invention relates to a lighting device and, more particularly, to a ceiling fitting or a ceiling light fixture.

2. Description of the Related Art

A conventional ceiling fitting is mounted on the ceiling of a house room to provide an illuminating function. In general, the conventional ceiling fitting is affixed to the ceiling by a plurality of fasteners, such as screws or expansion bolts, during the assembling process. However, operations of the fasteners easily do damage to the construction of the ceiling. In addition, it is difficult to operate the fasteners to mount the conventional ceiling fitting to the ceiling, thereby causing inconvenience to the operator during assembly.

BRIEF SUMMARY OF THE INVENTION

The primary objective of the present invention is to provide a ceiling light fixture that has a simplified construction and is assembled and disassembled easily and quickly.

In accordance with the present invention, there is provided a ceiling light fixture comprising a cover, a first mounting bracket, a second mounting bracket, and a plurality of retaining members. The first mounting bracket includes a bottom plate, a side plate, and a top plate. The top plate of the first mounting bracket has a middle provided with a receiving hole. The side plate of the first mounting bracket is located between and connects the bottom plate and the top plate. The side plate of the first mounting bracket has an upper end connected with a peripheral wall of the receiving hole of the top plate, and a lower end connected with the bottom plate. The first mounting bracket has a receiving recess defined between and enclosed by the bottom plate and the side plate. The side plate of the first mounting bracket is provided with a plurality of function holes. The second mounting bracket includes a bottom flange. Each of the retaining members includes a securing section, a first retaining section connected with the securing section, a second retaining section connected with the first retaining section, and a stop section connected with the second retaining section. An angle is defined between the first retaining section and the second retaining section. An elastic portion is formed between the first retaining section and the second retaining section. The elastic portion of each of the retaining members is located outside of the side plate of the first mounting bracket, and extends through one of the function holes of the side plate into the receiving recess of the first mounting bracket. The bottom flange of the second mounting bracket presses the first retaining section of each of the retaining members when each of the retaining members is moved to touch the second mounting bracket. After the bottom flange of the second mounting bracket slides and passes the first retaining section of each of the retaining members, each of the retaining members is restored and returned to an original position, and the bottom flange of the second mounting bracket is locked under the second retaining section of each of the retaining members.

According to the primary advantage of the present invention, each of the retaining members is secured to the first mounting bracket by each of the function holes of the side plate, and the first mounting bracket is mounted on the second mounting bracket by the retaining members, such that the cover and the first mounting bracket are mounted on the second mounting bracket easily and quickly, thereby facilitating the user assembling the ceiling light fixture.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
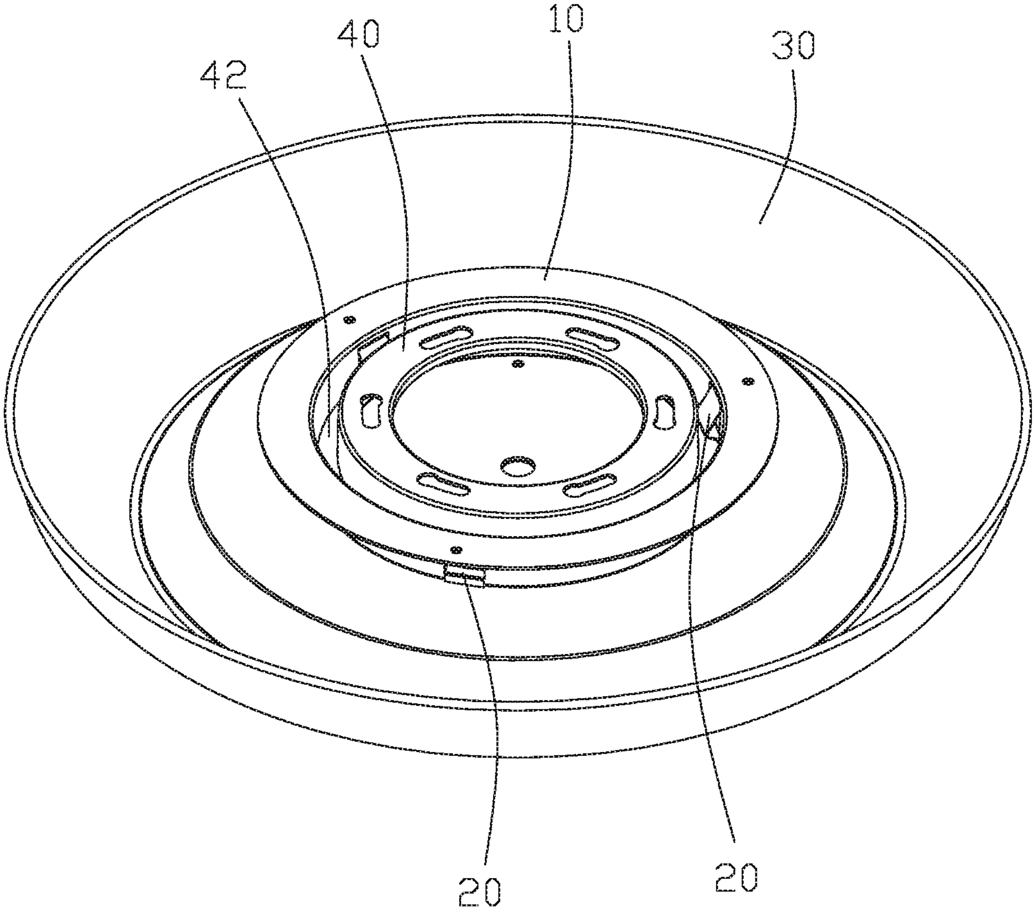
FIG. 1 is a perspective view of a ceiling light fixture in accordance with the preferred embodiment of the present invention.
Figure 2:
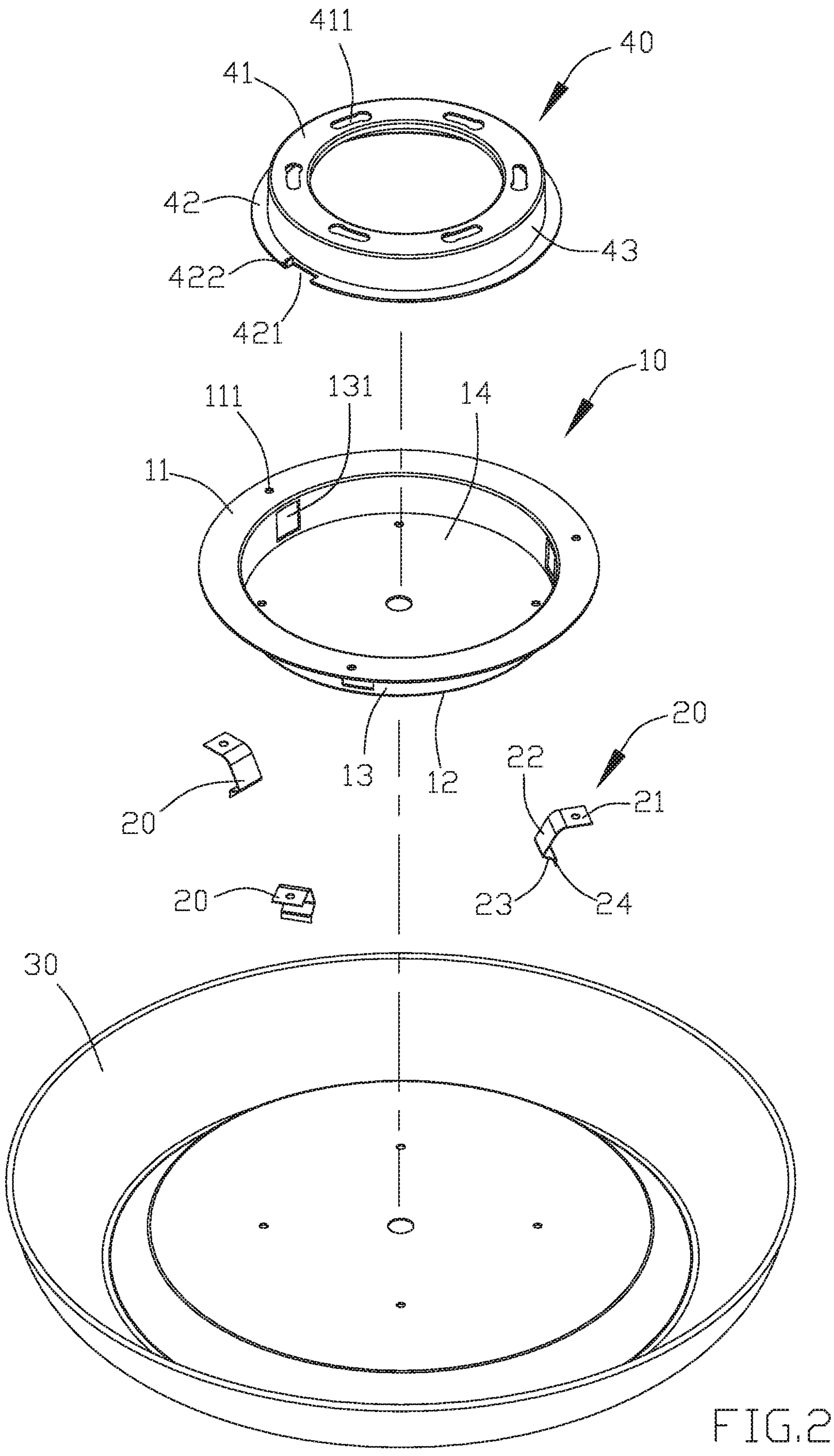
FIG. 2 is an exploded perspective view of the ceiling light fixture as shown in FIG. 1.

Referring to FIGS. 1-4, a ceiling light fixture in accordance with the preferred embodiment of the present invention comprises a cover (or lampshade or lamp bowl or lamp disk) 30, a first mounting bracket 10, a second mounting bracket 40, and a plurality of retaining members (or pieces or plates) 20. The ceiling light fixture is used to mount an illuminating apparatus (such as an LED light) on a preset position (such as a ceiling or a house wall). The cover 30 has an upper face mounted on a bottom face of the first mounting bracket 10. Each of the retaining members 20 is mounted on the first mounting bracket 10, and extends inward from a side face of the first mounting bracket 10. The second mounting bracket 40 has a first end mounted on the preset position and a second end positioned on the first mounting bracket 10 by locking of the retaining members 20.

The first mounting bracket 10 includes a bottom plate 12, a side plate 13, and a top plate 11. The top plate 11 of the first mounting bracket 10 has a middle provided with a receiving hole. The side plate 13 of the first mounting bracket 10 is located between and connects the bottom plate 12 and the top plate 11. The side plate 13 of the first mounting bracket 10 has an upper end connected with a peripheral wall of the receiving hole of the top plate 11, and a lower end connected with the bottom plate 12. The first mounting bracket 10 has a receiving recess 14 defined between and enclosed by the bottom plate 12 and the side plate 13. The side plate 13 of the first mounting bracket 10 is provided with a plurality of function holes 131 which extends in a horizontal direction and are distant from each other equally and evenly. Preferably, each of the function holes 131 of the side plate 13 has a square shape and is connected to the receiving recess 14.

The second mounting bracket 40 includes a bottom flange 42. The bottom flange 42 of the second mounting bracket 40 is disposed at a horizontal state.

Each of the retaining members 20 is flexible and includes a securing (or fixing) section 21, a first retaining section 22 connected with the securing section 21, a second retaining section 23 connected with the first retaining section 22, and a stop (or resting) section 24 connected with the second retaining section 23. An angle is defined between the first retaining section 22 and the second retaining section 23. An elastic portion is formed between the first retaining section 22 and the second retaining section 23. The elastic portion of each of the retaining members 20 is located outside of the side plate 13 of the first mounting bracket 10, and extends through one of the function holes 131 of the side plate 13 into the receiving recess 14 of the first mounting bracket 10.

In practice, the bottom flange 42 of the second mounting bracket 40 presses the first retaining section 22 of each of the retaining members 20 when each of the retaining members 20 is moved to touch the second mounting bracket 40. After the bottom flange 42 of the second mounting bracket 40 slides and passes the first retaining section 22 of each of the retaining members 20, each of the retaining members 20 is restored and returned to an original position, and the bottom flange 42 of the second mounting bracket 40 is locked under the second retaining section 23 of each of the retaining members 20.

In the preferred embodiment of the present invention, the securing section 21 of each of the retaining members 20 is mounted on the first mounting bracket 10. The first retaining section 22 of each of the retaining members 20 has an upper end connected with the securing section 21. The second retaining section 23 of each of the retaining members 20 has a lower end connected with the stop section 24. The stop section 24 of each of the retaining members 20 is locked on the side plate 13 of the first mounting bracket 10, and located outside of one of the function holes 131 of the side plate 13.

In the preferred embodiment of the present invention, the top plate 11 of the first mounting bracket 10 is provided with a plurality of through holes 111 located above and aligning with the function holes 131 of the side plate 13 respectively.

In the preferred embodiment of the present invention, the ceiling light fixture further comprises a plurality of fasteners each of which extends through one of the through holes 111 of the first mounting bracket 10 and is secured to the securing section 21 of one of the retaining members 20, such that the securing section 21 of each of the retaining members 20 is secured to the top plate 11 of the first mounting bracket 10, and each of the retaining members 20 is attached to the first mounting bracket 10.

In the preferred embodiment of the present invention, the second mounting bracket 40 further includes a top wall 41 and a connecting wall 43. The connecting wall 43 of the second mounting bracket 40 is located between and connects the top wall 41 and the bottom flange 42. The bottom flange 42 of the second mounting bracket 40 has an annular shape and extends radially and outward from a lower end of the connecting wall 43. The top wall 41 of the second mounting bracket 40 has an annular shape and extends radially and inward from an upper end of the connecting wall 43.

In the preferred embodiment of the present invention, the top wall 41 of the second mounting bracket 40 has a middle provided with a hollow. The top wall 41 of the second mounting bracket 40 is provided with a plurality of mounting slots 411 surrounding the hollow.

In the preferred embodiment of the present invention, the bottom flange 42 of the second mounting bracket 40 has a periphery provided with at least one opening 421 extending inward.

In the preferred embodiment of the present invention, the bottom flange 42 of the second mounting bracket 40 is further provided with at least one stop piece 422 located in the at least one opening 421.

In the preferred embodiment of the present invention, the ceiling light fixture comprises three retaining members 20, the top plate 11 of the first mounting bracket 10 is provided with three through holes 111, and the side plate 13 of the first mounting bracket 10 is provided with three function holes 131.

Figure 3:
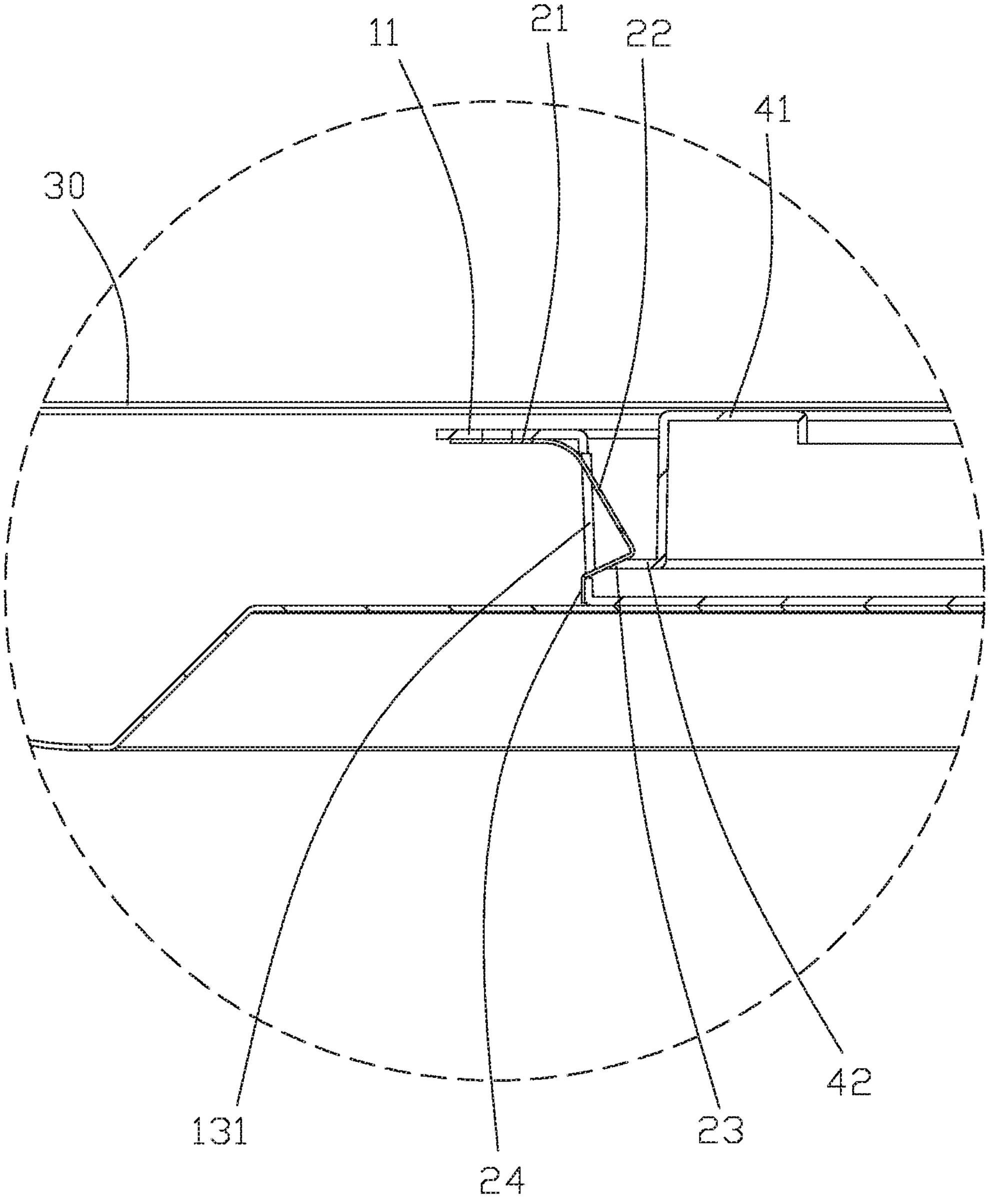
FIG. 3 is a locally enlarged cross-sectional view of the ceiling light fixture as shown in FIG. 1.
Figure 4:
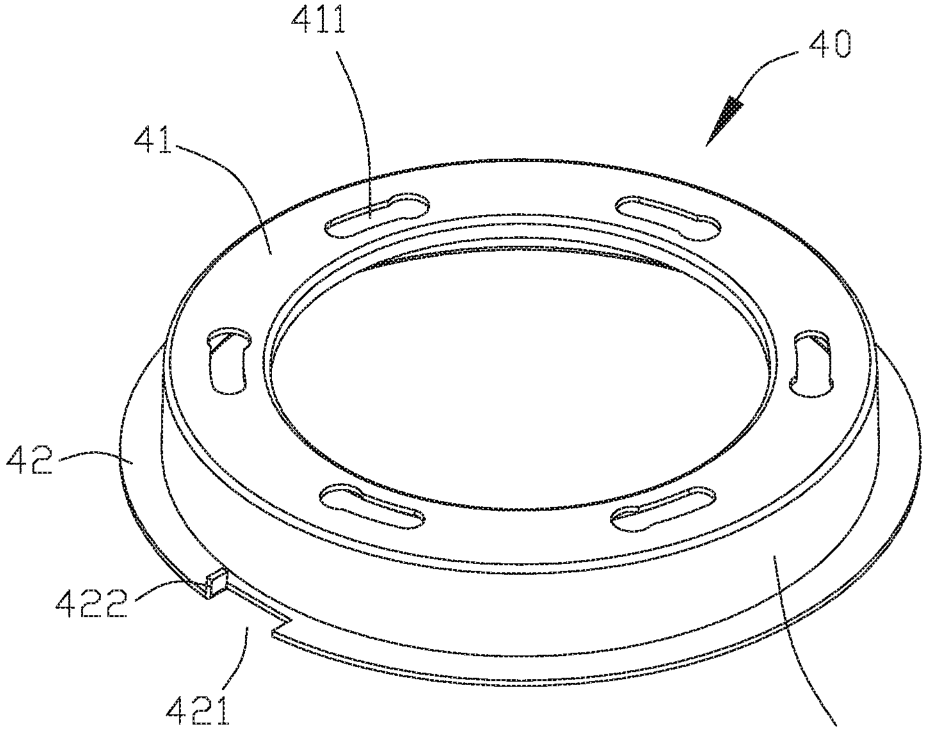
FIG. 4 is a perspective view of a second mounting bracket of the ceiling light fixture in accordance with the preferred embodiment of the present invention.

In assembly, the cover 30 is mounted on the first mounting bracket 10. Then, each of the retaining members 20 is mounted on the first mounting bracket 10. The elastic portion of each of the retaining members 20 is located outside of the side plate 13 of the first mounting bracket 10, and extends through one of the function holes 131 of the side plate 13 into the receiving recess 14 of the first mounting bracket 10. At this time, the stop section 24 of each of the retaining members 20 is locked on the side plate 13 of the first mounting bracket 10, and located outside of one of the function holes 131 of the side plate 13 as shown in FIG. 3. The securing section 21 of each of the retaining members 20 rests on the bottom of the top plate 11 of the first mounting bracket 10. Then, each of the fasteners extends through one of the through holes 111 of the first mounting bracket 10 and is secured to a perforation of the securing section 21 of one of the retaining members 20, such that the securing section 21 of each of the retaining members 20 is secured to the top plate 11 of the first mounting bracket 10, and each of the retaining members 20 is attached to the first mounting bracket 10.

When the first mounting bracket 10 is mounted on the second mounting bracket 40, the receiving hole of the first mounting bracket 10 aligns with the second mounting bracket 40, and the first mounting bracket 10 is pushed toward the second mounting bracket 40. In such a manner, the bottom flange 42 of the second mounting bracket 40 presses the first retaining section 22 of each of the retaining members 20 when each of the retaining members 20 is moved to touch the second mounting bracket 40. After the bottom flange 42 of the second mounting bracket 40 slides and passes the first retaining section 22 of each of the retaining members 20, each of the retaining members 20 is restored and returned to an original position, and the bottom flange 42 of the second mounting bracket 40 is locked under the second retaining section 23 of each of the retaining members 20. At this time, the three retaining members 20 interfere with the bottom flange 42 of the second mounting bracket 40, such that the second mounting bracket 40 is locked by the three retaining members 20. Thus, the first mounting bracket 10 is mounted on the second mounting bracket 40, so as to attach the cover 30 to the second mounting bracket 40. At this time, the first mounting bracket 10 is rotatable relative to the second mounting bracket 40.

If the user wishes to remove the cover 30 from the second mounting bracket 40, the first mounting bracket 10 is rotated relative to the second mounting bracket 40. When the first mounting bracket 10 is moved to a position where one of the retaining members 20 aligns with the at least one opening 421 of the second mounting bracket 40 and is stopped by the at least one stop piece 422 of the second mounting bracket 40, the first mounting bracket 10 is pulled downward relative to the second mounting bracket 40, such that one of the retaining members 20 is moved to pass through the at least one opening 421 of the second mounting bracket 40, and to detach from the second mounting bracket 40. In such a manner, one of the retaining members 20 is released from the second mounting bracket 40, to break the three-point interference relationship of the three retaining members 20, such that the other two of the three retaining members 20 cannot interfere with and lock the second mounting bracket 40 efficiently. Thus, a gap is formed between the first mounting bracket 10 and the second mounting bracket 40, such that the first mounting bracket 10 is driven by a manual labor and is detached from the second mounting bracket 40 easily and conveniently, thereby facilitating the user removing the cover 30 from the second mounting bracket 40.

Accordingly, each of the retaining members 20 is secured to the first mounting bracket 10 by each of the function holes 131 of the side plate 13, and the first mounting bracket 10 is mounted on the second mounting bracket 40 by the retaining members 20, such that the cover 30 and the first mounting bracket 10 are mounted on the second mounting bracket 40 easily and quickly, thereby facilitating the user assembling the ceiling light fixture. In addition, the ceiling light fixture has a simplified construction, thereby decreasing the cost of fabrication and production. Further, the bottom flange 42 of the second mounting bracket 40 is pressed by the retaining members 20, such that the first mounting bracket 10 is mounted on the second mounting bracket 40 exactly. Further, the first mounting bracket 10 is rotated relative to the second mounting bracket 40 to adjust the direction of the lamp.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A ceiling light fixture comprising:

a cover, a first mounting bracket, a second mounting bracket, and a plurality of retaining members;

wherein:

the first mounting bracket includes a bottom plate, a side plate, and a top plate;

the top plate of the first mounting bracket has a middle provided with a receiving hole;

the side plate of the first mounting bracket is located between and connects the bottom plate and the top plate;

the side plate of the first mounting bracket has an upper end connected with a peripheral wall of the receiving hole of the top plate, and a lower end connected with the bottom plate;

the first mounting bracket has a receiving recess defined between and enclosed by the bottom plate and the side plate;

the side plate of the first mounting bracket is provided with a plurality of function holes;

the second mounting bracket includes a bottom flange;

each of the retaining members includes a securing section, a first retaining section connected with the securing section, a second retaining section connected with the first retaining section, and a stop section connected with the second retaining section;

an angle is defined between the first retaining section and the second retaining section;

an elastic portion is formed between the first retaining section and the second retaining section;

the elastic portion of each of the retaining members is located outside of the side plate of the first mounting bracket, and extends through one of the function holes of the side plate into the receiving recess of the first mounting bracket;

the bottom flange of the second mounting bracket presses the first retaining section of each of the retaining members when each of the retaining members is moved to touch the second mounting bracket; and after the bottom flange of the second mounting bracket slides and passes the first retaining section of each of the retaining members, each of the retaining members is restored and returned to an original position, and the bottom flange of the second mounting bracket is locked under the second retaining section of each of the retaining members.

2. The ceiling light fixture of claim 1, wherein:

the securing section of each of the retaining members is mounted on the first mounting bracket;

the first retaining section of each of the retaining members has an upper end connected with the securing section;

the second retaining section of each of the retaining members has a lower end connected with the stop section; and the stop section of each of the retaining members is locked on the side plate of the first mounting bracket, and located outside of one of the function holes of the side plate.

3. The ceiling light fixture of claim 2, wherein the top plate of the first mounting bracket is provided with a plurality of through holes located above and aligning with the function holes of the side plate respectively.

4. The ceiling light fixture of claim 3, further comprising:

a plurality of fasteners each of which extends through one of the through holes of the first mounting bracket and is secured to the securing section of one of the retaining members, such that the securing section of each of the retaining members is secured to the top plate of the first mounting bracket, and each of the retaining members is attached to the first mounting bracket.

5. The ceiling light fixture of claim 1, wherein:

the second mounting bracket further includes a top wall and a connecting wall;

the connecting wall of the second mounting bracket is located between and connects the top wall and the bottom flange;

the bottom flange of the second mounting bracket extends outward from a lower end of the connecting wall; and the top wall of the second mounting bracket extends inward from an upper end of the connecting wall.

6. The ceiling light fixture of claim 5, wherein:

the top wall of the second mounting bracket has a middle provided with a hollow; and the top wall of the second mounting bracket is provided with a plurality of mounting slots surrounding the hollow.

7. The ceiling light fixture of claim 1, wherein the bottom flange of the second mounting bracket has a periphery provided with at least one opening extending inward.

8. The ceiling light fixture of claim 7, wherein the bottom flange of the second mounting bracket is further provided with at least one stop piece located in the at least one opening.

* * * * *